United States Patent [19]

Ogoe et al.

[11] Patent Number: 4,948,869

[45] Date of Patent: Aug. 14, 1990

[54] MOLDED ARTICLE OF POLY (M-PHENYLENE ISOPHTHALAMIDE) AND PROCESS FOR PRODUCING THE SAME

[75] Inventors: Hiroyuki Ogoe, Ayase; Masami Kinoshita, Zushi, both of Japan

[73] Assignee: Oiles Industry Co., Ltd., Tokyo, Japan

[21] Appl. No.: 161,367

[22] Filed: Feb. 22, 1988

Related U.S. Application Data

[63] Continuation of Ser. No. 808,741, Dec. 13, 1985, abandoned.

[51] Int. Cl.$^5$ .................. C08G 69/26; B29C 43/02
[52] U.S. Cl. .................... 528/348; 264/120; 264/126
[58] Field of Search ............ 264/126, 123, 120; 528/348

[56] References Cited

U.S. PATENT DOCUMENTS

| | | | |
|---|---|---|---|
| 3,413,394 | 11/1968 | Jordan | 264/126 |
| 3,925,323 | 12/1975 | Turnbull | 264/126 |
| 3,954,703 | 5/1976 | Turnbull | 524/445 |
| 3,965,236 | 6/1976 | Turnbull | 264/319 |
| 4,036,907 | 7/1977 | Turnbull | 528/348 |
| 4,243,574 | 1/1981 | Manwiller | 524/779 |
| 4,283,361 | 8/1981 | Longworth | 264/126 |
| 4,417,020 | 11/1983 | Bailey | 524/502 |
| 4,429,078 | 1/1984 | Cogswell et al. | 525/165 |
| 4,451,616 | 5/1984 | Kawachi et al. | 525/178 |
| 4,539,393 | 9/1985 | Tamura | 528/348 |

*Primary Examiner*—Jan H. Silbaugh
*Assistant Examiner*—Mary Lynn Fertig
*Attorney, Agent, or Firm*—Cushman, Darby & Cushman

[57] ABSTRACT

A molded article of poly (m-phenylene isophthalamide), which shows a bending strength of higher than 13 kg/mm$^2$, a density of 1.29 to 1.33 g/cm$^3$ and a Rockwell hardness of not less than M 120 and has an excellent electric insulation and chemical resistance even at a high temperature and a process for producing the same.

8 Claims, No Drawings

MOLDED ARTICLE OF POLY (M-PHENYLENE ISOPHTHALAMIDE) AND PROCESS FOR PRODUCING THE SAME

This is a continuation of application Ser. No. 808,741, filed Dec. 13, 1985, which was abandoned upon the filing hereof.

BACKGROUND OF THE INVENTION

The present invention relates to a molded article of poly(m-phenylene isophthalamide) (hereinafter referred to as "PMPI") and a process for producing the same.

More in detail, the present invention relates to a molded article excellent in electrical insulation and resistance to chemicals even at a high temperature, which shows a bending strength of higher than 13 kg/mm$^2$, a density of 1.29 to 1.33 g/cm$^3$ and a Rockwell hardness of not less than M 120, and a process for producing the same.

Hitherto, as a process for producing molded articles of PMPI, a method of sintering poly(m-phenylene isophthalamide) in an inert atmosphere (ordinarily in nitrogen atmosphere) has been known and adopted as are disclosed in Japanese Patent Publication No. 56-2092 (1981), Japanese Patent Application Laid-Open No. 55-131024 (1980) and Japanese Patent Application Laid-Open No. 57-164 (1982).

The reason why such a sintering method has been adopted is that the practically usable molded articles are very difficultly available by the melt-molding method comprising extruding, injection or compression, because the melting point of PMPI is very high and is close to the decomposition temperature thereof and accordingly, the melting and the decomposition thereof occur nearly simultaneously.

In addition, since PMPI is hygroscopic, when it is subjected to the above-mentioned melt-molding method accompanied by melt-flowing, blisters, cracks or cavities are apt to be formed not only by the gas generated by thermal decomposition of PMPI but also by the vaporization of the moisture contained within PMPI and accordingly, the molded articles produced by the above-mentioned melt-molding method have not been commercialized in market.

On the other hand, it has been generally known that the molded articles produced by sintering method is lower in the mechanical strength as compared to the molded articles produced by melt-molding method.

The mechanical strength of the molded articles produced by sintering method depends greatly on the applied pressure utilized for fabricating preforms of PMPI. More in detail, in the case where the applied pressure is small, the extent of compression of the powder is necessarily small and the porosity of the preform is large and accordingly, the mechanical strength of the molded articles obtained by sintering such a preform is small.

Accordingly, in order to produce the molded articles by sintering method, having high mechanical strength comparative to that of the molded articles by melt-molding method, it is necessary to utilize a remarkably large pressure for fabricating preform of PMPI powder.

Namely, PMPI is subjected to preforming under a high pressure of not less than 700 kg/cm$^2$, preferably not less than 2,000 kg/cm$^2$ and more preferably 3,000 to 7,000 kg/cm$^2$ at a temperature of not more than 250° C., and then the thus obtained preform is sintered at a temperature of 260° to 320° C. in an inert atmosphere at ordinary pressure to be a molded article.

Consequently, in the case of obtaining the molded articles of PMPI by sintering method, the pressure utilized for fabricating preform is a dominant factor and in such a case, it is necessary to install a press of a high output.

In other words, in the case of using an ordinary press, only the molded articles of small in molding surface are available.

In addition to the above-mentioned problems, the sintering method necessitates not only a sintering furnace which can adjust the atmosphere therein by nitrogen but also a long sintering time.

As a result of the present inventors' studies for solving the above-mentioned problems, namely, finding a process for producing molded articles of poly(m-phenylene isophthalamide) excellent in mechanical strength by a lower molding pressure and a shorter molding time than those in the conventional sintering method, the present inventors have found that the molded articles of PMPI of the density of less than 1.29 g/cm$^3$ have the internal defects such as cavities, blisters or the cracks on the surface thereof with the appearance of frosted graysh white, and the physical properties of such molded articles are low and vary widely.

The above-mentioned defects in the ordinary engineering plastic products are apt to be simply solved as the results of too high or too low of the molding temperature or molding pressure, or the defficiency of drying of molding material.

However, in the case of the heat-resistant high polymer such as aromatic polyamide resin showing a high melting point close to the decomposition temperature thereof and behaviors as thermo-setting synthetic resin, the problems can not be solved by adjusting the temperature and pressure during manufacturing. Namely, it is necessary for solving the problems to collectively examine the bulk density of the powdery resin, the heating and pressing conditions in fabricating preform, the molding conditions thereafter and the cooling conditions of the thus molded articles, etc. in addition to all the factors mentioned above.

As a result of carrying out a number of experiments by varying the bulk density of the PMPI powder, the extent of drying thereof, the pressure and the mold temperature in fabricating preform from the powder and the pressure and the temperature in molding the preform, the present inventors have found that the molded articles produced by the process comprising the steps of (1) drying PMPI powder having a bulk density of 0.2 to 0.4 g/cm$^3$, a specific surface area of 2 to 8 m$^2$/g and a mean particle size of 37 to 500 μm so that the moisture content thereof becomes to not more than 1% by weight, (2) fabricating preforms therefrom by compressing the PMPI powder under a pressure of 70 to 500 kg/cm$^2$ at a temperature of not more than 250° C., and (3) molding the thus compressed material under a molding pressure of at least 70 kg/cm$^2$ at a temperature of 290° to 360° C. for 1 to 5 min per 1 mm of the thickness of the thus molded articles, which show a density of 1.29 to 1.33 g/cm$^3$ and are excellent in mechanical properties with a small fluctuation in physical properties, and the present inventors have attained the present invention based on the findings.

SUMMARY OF THE INVENTION

In a first aspect of the invention, there is provided a molded article of poly(m-phenylene isophthalamide) having a bending strength of not less than 13 kg/mm$^2$, a density of 1.29 to 1.33 g/cm$^3$ and a Rockwell hardness of not less than M 120.

In a second aspect of the invention, there is provided a process for producing a molded article of poly(m-phenylene isophthalamide), comprising the steps of drying a poly(m-phenylene isophthalamide) powder having a bulk density of 0.2 to 0.4 g/cm$^3$, a specific surface area of 2 to 8 m$^2$/g and a mean particle size of 37 to 500 μm to the moisture content of not more than 1% by weight, filling the thus dried poly(m-phenylene isophthalamide) powder into a mold kept at a temperature of not more than 250° C., compressing the thus filled poly(m-phenylene isophthalamide) powder under a pressure of 70 to 500 kg/cm$^2$, molding the thus compressed poly(m-phenylene isophthalamide) powder at a temperature of 290° to 360° C. under a pressure of at least 70 kg/cm$^2$ for 1 to 5 min per 1 mm of the thickness of the molded article to be produced, and cooling the thus molded article to a temperature of not more than 250° C., while keeping the pressure of the molding step.

DETAILED DESCRIPTION OF THE INVENTION

Molded articles of PMPI according to the present invention show (1) a bending strength of not less than 13 kg/mm$^2$, preferably not less than 15 kg/mm$^2$, (2) a density of 1.29 to 1.33 g/cm$^3$, preferably 1.31 to 1.33 g/cm$^3$, (3) a Rockwell hardness of not less than M 120, preferably M 121 to M 125, and (4) an excellent electrical insulation and resistance to chemicals even at a high temperature, and are favorably suitable as the sliding members such as plain bearing and roller bearing, the guides accompanying friction and abrasion, the members to which electrical insulation is required such as screws, etc. for use in transformers and as the members to which chemical resistance at a high temperature is required.

In the present invention, PMPI is a polycondensate of m-phenylenediamine and isophthaloyl halide, and in order to obtain the molded articles of PMPI according to the present invention, it is necessary to use a powder of PMPI showing a molecular weight of 20,000 to 30,000, a bulk density of 0.2 to 0.4 g/cm$^3$, preferably 0.3 to 0.4 g/cm$^3$, a mean particle size of 37 to 500 μm, preferably 43 to 250 μm and a specific surface area of 2 to 8 m$^2$/g, preferably about 4.8 m$^2$/g as well a moisture content of not more than 1% by weight.

The above-mentioned PMPI is obtained by reacting m-phenylenediamine with isophthaloyl halide in an organic and polar solvent which is not a good solvent for the thus formed PMPI, such as ether, ketone, sulfone, halogenated hydrocarbon, nitrile and nitro compound, thereby producing a solution or dispersion containing oligomers of the reactants and then contacting the thus obtained solution or dispersion to an aqueous solution of an acid receptor, for instance, a water-soluble strong base or weak base, thereby further polymerizing the oligomers (refer to Japanese Patent Publication No. 47-10863 (1972)). As the example of PMPI, CONEX ® powder (made by TEIJIN Co., Ltd.) of a molecular weight of 22,000 may be exemplified.

The CONEX ® powder shows a bulk density of 0.295 to 0.393 g/cm$^3$ in the case of the mean particle size thereof is 150 mesh (104 μm, Japanese Industrial Standards), and shows a specific surface area of 4.8 m$^2$/g in the case of the particles passing through the sieve of 48 mesh (297 μm, Japanese Industrial Standards).

The PMPI powder having bulk density of higher than 0.4 g/cm$^3$ shows a remarkably reduced moldability, and according to the result of the present inventors' experiment, the PMPI powder of a bulk density of over 0.4 g/cm$^3$ was apt to form whitely turbid parts in the molded articles presumably due to the nonuniform distribution of the pressure and the poor fluidity of the powder, and any satisfiable molded articles were not obtained.

Namely, it is preferable to use the PMPI powder of a smaller bulk density, however, it is poor economy to use PMPI powder of an extremely small bulk density, because the yield in the sifting the PMPI powder is reduced and accordingly, it is preferable to use the PMPI powder of a bulk density of not less than 0.2 g/cm$^3$.

Since the PMPI powder contains, as has been stated, a moisture, it is necessary to thermally drying the PMPI powder in advance of molding thereof. According to the result of the present inventors' experiment, it is important to reduce the moisture content to not more than 1% by weight. For instance, in the case of drying under ordinary pressure, the moisture content thereof can be reduced to not more than 1% by weight by heating thereof at 140° C. for about 15 min.

The molded articles of PMPI according to the present invention are produced under the lower pressure and the shorter molding time than those in the conventional method.

Namely, after thermally drying the PMPI powder of a bulk density of 0.2 to 0.4 g/cm$^3$ and of a specific surface area of 2 to 8 m$^2$/g so as to reduce a moisture content thereof to not more than 1% by weight, the thus dried PMPI powder is filled in a mold kept at a temperature of not more than 250° C. Then, after pressing the thus filled PMPI powder under a pressure of 70 to 500 kg/cm$^2$, preferably 150 to 200 kg/cm$^2$, the thus formed preform is molded in the same or another mold at a mold temperature of 290° to 360° C., preferably 300° to 330° C. under a molding pressure of at least 70 kg/cm$^2$, preferably 150 to 200 kg/cm$^2$ for 1 to 5 min per 1 mm of the thickness of the molded article to be produced. After the lapse of the predetermined molding time, the thus molded article is cooled to a temperature of not more than 250° C.

At filling the mold with the PMPI powder, the mold temperature may be ordinary temperature, however, in order to prevent the moisture-absorption by the PMPI powder, it is preferable to keep the mold at a temperature of not more than 100° C., and such a heating of the mold is useful in shortening the molding cycle.

On the other hand, in the case where the mold temperature at filling the mold with PMPI powder is over 250° C., molding unevenness is apt to be caused in the molding step and the molded article of a density of 1.29 to 1.33 g/cm$^3$ is not obtained. Consequently, the mold temperature at filling thereof with the PMPI powder should not be over 250° C.

In the case where the formed preform is taken out from the mold, transferred to another mold for molding and subjected to thermal molding under a pressure, the preform may have the strength enough not to be broken on handling thereof.

The pressure for fabricating the self-supporting preform depends on the temperature of preliminary drying the PMPI powder and the mold temperature, however, it is ordinarily 70 to 500 kg/cm², and in the case where the mold is heated to 150° to 250° C., the pressure of 70 to 200 kg/cm² is sufficient.

On the other hand, in the case where the mold used for fabricating the preform is continuously used for the compression-molding, the pressure may be at least 70 kg/cm².

The above-mentioned pressure for fabricating the preform according to the present invention is about one-twentieth to half of the pressure for fabricating a preform in the conventional method. This means that the output of the installation such as a press for the process according to the present invention may be one-tenth to one-twentieth in type as large as that of the installation in the conventional method, and in other words, according to the present invention, it is possible to produce the molded articles of a molded surface area of 10 to 20 times as large as that of the molded articles produced by the conventional method.

The compression-molding step is explained as follows.

In both of the method wherein the preform is taken out from the mold and is transferred to another mold for compression-molding and the method wherein the mold used for fabricating the preform is continuously used as the mold for compression-molding to obtain the molded articles, the preform is subjected to compression-molding under a pressure of at least 70 kg/cm², preferably 150 to 200 kg/cm² in the mold kept at a temperature of 290° to 360° C. for 1 to 5 min per 1 mm of the thickness of the thus produced, molded article. In the case where the mold temperature is below 290° C., the fluidization of the PMPI powder is insufficient, and the pressure is not uniformly transmitted, thereby frequently causing nonuniform molding represented by graysh white parts in the molded articles. The problem was intended to be solved by the raised pressure, however, in vain.

In addition, in the case where the mold temperature is over 360° C., brownish rosy parts presumably due to the decomposition of PMPI appeared on the molded articles and the product was apt to form cracking. Although it was intended to solve the problem by shortening the molding time, any satisfiable molded article could be obtained.

The present inventors have found after having carried out various experiments that the molding time of 1 to 5 min per 1 mm of the thickness of the thus produced, molded articles is preferable. In general, in the above-mentioned range of the molding temperature, the molding time may be shorter when the molding temperature is higher. In the case of producing the molded article of the larger thickness, the molding which is carried out at a relatively low temperature for a little longer time is preferable.

The molding pressure is preferably changed correspondingly to the form or shape of the molded article to be produced. For instance, in the case of producing the molded articles having the upstanding area being larger as compared to the projected area or in the case of producing the molded article having unevenness, it is necessary to apply a little higher molding pressure, and by applying at least 70 kg/cm² of the molding pressure, satisfiable molded article can be obtained.

After the lapse of the predetermined molding time, the thus molded article is cooled to a temperature of not more than 250° C. while keeping the pressure of the molding step, and after releasing the pressure, the mold is opened to obtain the molded article of PMPI which is pale yellowish brown in colour and is glossy although it is opaque. In such a step, in the case where the temperature of the molded article is over 250° C., difficulties such as sticking of the molded article to the inner surface of the mold are caused.

The thus obtained, molded article according to the present invention shows a bending strenth of not less than 13 kg/mm², preferably not less than 15 kg/mm², a density of 1.29 to 1.33 g/cm³, preferably 1.31 to 1.33 g/cm³ and a Rockwell hardness of not less than M 120, preferably M 121 to M 125 and an excellent electrical insulation and resistance to chemicals even at a high temperature.

The present invention will be explained more in detail while referring to Examples as follows. However, the present invention is not restricted to Examples under mentioned. From the foregoing description, one skilled in the art can easily ascertain the essential characteristics of the present invention, and without departing from the spirit and scope thereof, can make various changes and modifications of the present invention to adapt it to various usages and conditions,

EXAMPLE 1

Poly(m-phenylene isophthalamide) powder (made by TEIJIN Co., Ltd., under the registered trade name of CONEX ®) of a bulk density of 0.30 g/cm³, a mean particle size of 297 μm and a specific surface area of 4.8 m²/g was dried for 15 min at a temperature of 140° C. to a residual moisture content of 0.65% by weight, and the thus dried PMPI powder was filled in a mold heated to 150° C. and subjected to compression under a pressure of 150 kg/cm² to be a preform of PMPI powder.

The mold holding the thus formed preform was heated to 310° C. while keeping the pressure thereof and then the preform was compression-molded at a temperature of 310° C. and under a pressure of 150 kg/cm² for 15 min.

Then, after cooling the thus molded article to 150° C. while keeping the pressure thereof, the mold was opened to obtain the molded article of 50 mm in length, 100 mm in width and 4 mm in thickness.

A density, a Rockwell hardness and a bending strength of the thus obtained, molded article were 1.33 g/cm³, M 123 and 18.0 kg/mm², respectively, and the molded article was opaque and pale yellowish brown without any cracking and blisters.

The determination of the bending strength of the molded article was carried out according to the method of Japanese Industrial Standards (JIS) K-6911.

EXAMPLES 2 to 5

Under the same manner as in Example 1 except for only molding pressure which is shown in Table 1, each of molded articles shown in Table 1 was produced.

COMPARATIVE EXAMPLE 1

In the same manner as in Example 1 except for drying the same PMPI powder as in Example 1 to a moisture content of 2% by weight, a molded article was obtained. The physical properties and the appearance of the thus obtained, molded article are shown also in Table 1.

COMPARATIVE EXAMPLE 2

In the same manner as in Example 1 except for adopting a mold temperature of 290° C. at filling the mold with PMPI powder, a molded article was obtained, the physical properties and the appearance thereof being shown also in Table 1.

COMPARATIVE EXAMPLE 3

In the same manner as in Example 1 except for adopting a molding temperature of 270° C. and a molding time of 25 min, a molded article was obtained, the physical properties and the appearance thereof being also shown in Table 1.

COMPARATIVE EXAMPLE 4

In the same manner as in Example 1 except for adopting a molding temperature of 400° C. and a molding time of 10 min, a molded article was obtained, the physical properties and the appearance thereof being also shown in Table 1.

TABLE 1

| Case | Molding pressure (kg/cm$^2$) | Density (g/cm$^3$) | Rockwell hardness (M scale) | Bending strength (kg/mm$^2$) | Appearance of the molded article Colour tone | Appearance of the molded article Cracks, etc. | Evaluation |
| --- | --- | --- | --- | --- | --- | --- | --- |
| Example 1 | 150 | 1.33 | 123 | 18.0 | opaque pale yellowish brown | none | good |
| Example 2 | 70 | 1.32 | 122 | 17.5 | same as above | none | good |
| Example 3 | 200 | 1.31 | 122 | 17.6 | same as above | none | good |
| Example 4 | 400 | 1.31 | 121 | 17.4 | same as above | none | good |
| Example 5 | 700 | 1.32 | 122 | 18.0 | same as above | none | good |
| Comparative Example 1 | 150 | 1.20 | 106 | —*1 | partially gray | cracks and blisters | bad |
| Comparative Example 2 | 150 | 1.25 | 109 | 10.3 | same as above | none | bad |
| Comparative Example 3 | 150 | 1.24 | 105 | 7.5 | totally gray | none | bad |
| Comparative Example 4 | 150 | 1.27 | —*1 | —*1 | totally brownish pink | cracks | bad |

Note:
*1 undeterminable.

As seen from the results shown in Table 1, although the excellent molded articles were obtained according to the present invention, it was impossible to obtain any satisfactory molded article in each of Comparative Examples.

In addition, as seen from the results of Examples 1 to 5, the raising of the molding pressure did not substantially influence the physical properties of the molded articles.

Namely, the physical properties of the molded articles of PMPI is not influenced by the molding pressure, however, greatly influenced by the other conditions, for instance, the bulk density, the specific surface area and the moisture content of the PMPI powder, the temperature of the mold at filling the PMPI powder and the molding temperature, and it is extremely difficult to compensate the inadequency of one of the conditions by the adjustment of the other condition(s).

Accordingly, only by the molding process provided with the above-mentioned conditions according to the present invention, the molded articles of constant physical properties are available easily together with a favorable reproducibility.

What is claimed is:

1. A molded article of poly(m-phenylene isophthalamide) having a bending strength of not less than 13 kg/mm$^2$, a density of 1.29 to 1.33 g/cm$^3$ and Rockwell hardness of not less than M 120.

2. The molded article according to claim 1, produced by the steps of drying a poly(m-phenylene isophthalamide) powder having a bulk density of 0.2 to 0.4 g/cm$^3$, a specific surface area of 2 to 8 m$^2$/g and a mean particle size of 37 to 500 μm to the moisture content of not more than 1% by weight, filling the thus dried poly(m-phenylene isophthalamide) powder into a mold kept at a temperature of not more than 250° C., compressing the thus filled poly(m-phenylene isophthalamide) powder under a pressure of 70 to 500 kg/cm$^2$, molding the thus compressed poly(m-phenylene isophthalamide) powder at a temperature of 290° to 360° C. under a pressure of at least 70 kg/cm$^2$ for 1 to 5 min per 1 mm of the thickness of the molded article to be produced, and cooling the thus molded article to a temperature of not more than 250° C., while keeping the pressure of the molding step.

3. The molded article according to claim 1, wherein the molecular weight of said poly(m-phenylene isophthalamide) is 20,000 to 30,000.

4. The molded article according to claim 2, wherein said poly(m-phenylene isophthalamide) powder is filled in said mold kept at a temperature of 150° to 250° C. and is compressed under a pressure of 70 to 200 kg/cm$^2$.

5. A process for producing a molded article of poly(m-phenylene isophthalamide), comprising the steps of drying a poly(m-phenylene isophthalamide) powder of a bulk density of 0.2 to 0.4 g/cm$^3$, a specific surface area of 2 to 8 m$^2$/g and a mean particle size of 37 to 500 μm to the moisture content of not more than 1% by weight, filling the thus dried poly(m-phenylene isophthalamide) powder into a mold kept at a temperature of not more than 250° C., compressing the thus filled poly(m-phenylene isophthalamide) powder under a pressure of 70 to 500 kg/cm$^2$, molding the thus compressed poly(m-phenylene isophthalamide) powder at a temperature of 290° to 360° C. under a pressure of at least 70 kg/cm$^2$ for 1 to 5 min per 1 mm of the thickness of the molded article to be produced, and cooling the thus molded article to a temperature of not more than 250° C., while keeping the pressure of the molding step.

6. The process according to claim 5, wherein a density, a bending strength and Rockwell hardness of said molded article are 1.29 to 1.33 g/cm$^3$, not less than 13 kg/mm$^2$ and not less than M 120, respectively.

7. The process according to claim 5, wherein the molecular weight of said poly(m-phenylene isophthalamide) is 20,000 to 30,000.

8. The process according to claim 5, wherein said poly(m-phenylene isophthalamide) powder is filled into said mold kept at a temperature of 150° to 250° C. and is compressed under a pressure of 70 to 200 kg/cm$^2$ in said mold.

* * * * *